(12) United States Patent
Imai et al.

(10) Patent No.: US 11,286,870 B2
(45) Date of Patent: Mar. 29, 2022

(54) CATALYST TEMPERATURE CALCULATING DEVICE, AND CONTROLLER FOR INTERNAL COMBUSTION ENGINE

(71) Applicant: TOYOTA JIDOSHA KABUSHIKI KAISHA, Toyota (JP)

(72) Inventors: Sohichi Imai, Toyota (JP); Shigeki Nakayama, Toyota (JP); Masanao Idogawa, Toyota (JP); Daigo Ando, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 237 days.

(21) Appl. No.: 16/546,360

(22) Filed: Aug. 21, 2019

(65) Prior Publication Data

US 2020/0102901 A1 Apr. 2, 2020

(30) Foreign Application Priority Data

Sep. 28, 2018 (JP) .............................. JP2018-185314

(51) Int. Cl.
*F02D 41/02* (2006.01)
*F01N 9/00* (2006.01)
*F01N 11/00* (2006.01)

(52) U.S. Cl.
CPC ......... *F02D 41/0295* (2013.01); *F01N 9/005* (2013.01); *F01N 11/002* (2013.01); *F01N 11/007* (2013.01); *F01N 2900/1602* (2013.01); *F01N 2900/1624* (2013.01)

(58) Field of Classification Search
CPC combination set(s) only.
See application file for complete search history.

(56) References Cited

U.S. PATENT DOCUMENTS

| | | | | |
|---|---|---|---|---|
| 2007/0266696 | A1* | 11/2007 | Kawakita | F01N 1/02 60/276 |
| 2008/0302084 | A1* | 12/2008 | Oswald | F01N 11/005 60/276 |
| 2010/0100304 | A1* | 4/2010 | Yasui | F02D 41/405 701/104 |

(Continued)

FOREIGN PATENT DOCUMENTS

| JP | 2012-062795 A | 3/2012 |
|---|---|---|
| JP | 2012-251428 A | 12/2012 |

(Continued)

*Primary Examiner* — Binh Q Tran
(74) *Attorney, Agent, or Firm* — Oliff PLC

(57) ABSTRACT

A catalyst having an oxygen storage capacity is provided in an exhaust passage of an internal combustion engine. A catalyst temperature calculating device calculates an oxygen storage amount of the catalyst to a value greater than or equal to zero and less than or equal to than a maximum value based on an amount of oxygen and an amount of unburned fuel components in a fluid flowing into the catalyst. A temperature calculation process calculates a temperature of the catalyst assuming that an amount of temperature rise of the catalyst is larger when an increase amount of the oxygen storage amount is large than when the increase amount of the oxygen storage amount is small in a case where the oxygen storage amount increases.

8 Claims, 5 Drawing Sheets

(56) References Cited

U.S. PATENT DOCUMENTS

| | | | | |
|---|---|---|---|---|
| 2011/0072785 | A1* | 3/2011 | Loehr | F01N 3/0871 60/274 |
| 2015/0204258 | A1* | 7/2015 | Kumar | F02D 41/0235 60/274 |
| 2017/0342927 | A1* | 11/2017 | Miyamoto | G01N 33/007 |

FOREIGN PATENT DOCUMENTS

| | | |
|---|---|---|
| JP | 2015-161290 A | 9/2015 |
| JP | 2016-048059 A | 4/2016 |

* cited by examiner

CATALYST TEMPERATURE CALCULATING DEVICE, AND CONTROLLER FOR INTERNAL COMBUSTION ENGINE

BACKGROUND

1. Field

The present disclosure relates to a catalyst temperature calculating device to be applied to an internal combustion engine provided with a catalyst in an exhaust passage. The present disclosure also relates to a controller for an internal combustion engine.

2. Description of Related Art

For example, Japanese Laid-Open Patent Publication No. 2015-161290 describes a device that calculates the temperature of a catalyst by determining a correction amount of the temperature of the catalyst according to the number of cylinders in which fuel cutoff process is executed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the present disclosure will now be described.

EXAMPLE 1

A catalyst temperature calculating device applied to an internal combustion engine is provided. A catalyst having an oxygen storage capacity is provided in an exhaust passage of the internal combustion engine. The catalyst temperature calculating device includes a processor that is configured to perform:

a storage amount calculation process of calculating an oxygen storage amount of the catalyst to a value greater than or equal to zero and less than or equal to than a maximum value based on an amount of oxygen and an amount of unburned fuel components in a fluid flowing into the catalyst; and a temperature calculation process of calculating a temperature of the catalyst assuming that an amount of temperature rise of the catalyst is larger when an increase amount of the oxygen storage amount is large than when the increase amount of the oxygen storage amount is small in a case where the oxygen storage amount calculated by the storage amount calculation process increases.

In the above configuration, the oxygen storage amount is calculated to a value less than or equal to the maximum value by the oxygen storage amount calculation process. Therefore, by the fuel cutoff process or the like, even if a large amount of oxygen flows into the catalyst, the oxygen storage amount is not calculated to be a value larger than the maximum value if the calculated value of the oxygen storage amount is the maximum value. Then, when the oxygen storage amount calculated by the oxygen storage amount calculation process increases, the temperature of the catalyst is calculated based on the increase amount of the oxygen storage amount. Therefore, it is possible to calculate the temperature of the catalyst with high accuracy, as compared with, for example, the case where although the oxygen storage amount of the catalyst has reached the maximum value, the calculated value of the temperature of the catalyst is increased based on the inflow of excessive oxygen into the catalyst.

The cause of temperature rise of the catalyst includes a heat generation when the oxygen storage amount is increased by the reaction between oxygen in the fluid flowing into the catalyst and cerium in the catalyst, and a heat generation due to the reaction between oxygen stored in the catalyst and unburned fuel in the fluid flowing into the catalyst. Especially in the former case (cerium reaction heat), even if the amount of unburned fuel in the fluid flowing into the catalyst is negligible, and the amount of oxygen in the fluid is excessive, when the oxygen storage amount of the catalyst is the maximum value, the amount of generated heat resulting from the reaction of cerium is negligible. Therefore, for example, when the correction amount is determined in accordance with the number of cylinders subjected to the fuel cutoff regardless of the oxygen storage amount, the temperature of the catalyst cannot be accurately estimated. The above configuration solves such a problem.

EXAMPLE 2

In the catalyst temperature calculating device of Example 1, the temperature calculation process includes a process of calculating the temperature of the catalyst assuming that the amount of temperature rise of the catalyst is larger when a decrease amount of the oxygen storage amount is large than when the decrease amount of the oxygen storage amount is small in a case where the oxygen storage amount calculated by the storage amount calculation process decreases.

In the above configuration, when the calculated value of the oxygen storage amount decreases, the temperature of the catalyst is calculated assuming that the amount of temperature rise of the catalyst is larger when the decrease amount of the oxygen storage amount is large than when the decrease amount of the oxygen storage amount is small. Therefore, the temperature of the catalyst is accurately calculated not only when the calculated value of the oxygen storage amount increases but also when it decreases.

EXAMPLE 3

In the catalyst temperature calculating device of Example 1 or 2, the temperature calculation process includes a process of dividing a section of the catalyst from an upstream end to a downstream end into a plurality of regions, the plurality of regions having a first region and a second region downstream of the first region, and a process of calculating a temperature of each of the first region and the second region assuming that an amount of temperature rise of the first region is larger than an amount of temperature rise of the second region in a case where the oxygen storage amount calculated by the storage amount calculation process increases.

In the above configuration, assuming that the amount of temperature rise of the first region of the catalyst is larger than the amount of temperature rise of the second region, the temperatures of the first region and the second region are calculated. Therefore, the tendency that the storage amount of oxygen flowing into the catalyst in the first region tends to be larger than the storage amount in the second region can be reflected in the temperature calculation of the first region and the second region, and as a result, the temperature of the catalyst is calculated more accurately.

EXAMPLE 4

The catalyst temperature calculating device of any one of Examples 1 to 3 further includes an air-fuel ratio sensor downstream of the catalyst. The processor is further configured to perform a maximum storage amount learning process of learning and updating the maximum value based on a value detected by the air-fuel ratio sensor. The storage amount calculation process includes a process of calculating the oxygen storage amount based on the maximum value learned by the maximum storage amount learning process.

In the above configuration, the oxygen storage amount is calculated based on the maximum value of the oxygen storage amount calculated by the maximum storage amount learning process. Therefore, even when the maximum value of the oxygen storage amount changes due to aging deterioration the catalyst, the oxygen storage amount of the catalyst can be calculated while accurately acquiring the maximum value of the oxygen storage amount.

EXAMPLE 5

A controller for an internal combustion engine is provided. The internal combustion engine is mounted on a vehicle including a rotating electric machine as a drive source. A catalyst having an oxygen storage capacity is provided in an exhaust passage of the internal combustion engine. The controller is configured to perform a storage amount calculation process of calculating an oxygen storage amount of the catalyst to a value greater than or equal to zero and less than or equal to than a maximum value based on an amount of oxygen and an amount of unburned fuel components in a fluid flowing into the catalyst, a temperature calculation process of calculating a temperature of the catalyst assuming that an amount of temperature rise of the catalyst is larger when an increase amount of the oxygen storage amount is large than when the increase amount of the oxygen storage amount is small in a case where the oxygen storage amount calculated by the storage amount calculation process increases, and a start process of starting the internal combustion engine based on the temperature of the catalyst calculated by the temperature calculation process when the vehicle is in a state of capable of traveling and the internal combustion engine is in a stopped state.

In the above configuration, the start process of starting the internal combustion engine is performed based on the temperature of the catalyst estimated while taking into consideration the maximum value of the oxygen storage amount. Therefore, for example, in comparison with the case of using the temperature of the catalyst estimated without taking into consideration the maximum value of the oxygen storage amount, the start process is performed based on the accurate estimated value of catalyst temperature, and as a result, the stop time of the internal combustion engine is extended.

EXAMPLE 6

A catalyst temperature calculating method is provided that performs the various processes described in Examples 1 to 5.

EXAMPLE 7

A non-transitory computer readable memory medium is provided that stores a program that causes a processing device to perform the various processes described in Examples 1 to 5.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A controller 50 for an internal combustion engine 10 according to an embodiment of the present disclosure will now be described with reference to FIGS. 1 to 6.

Figure 1:
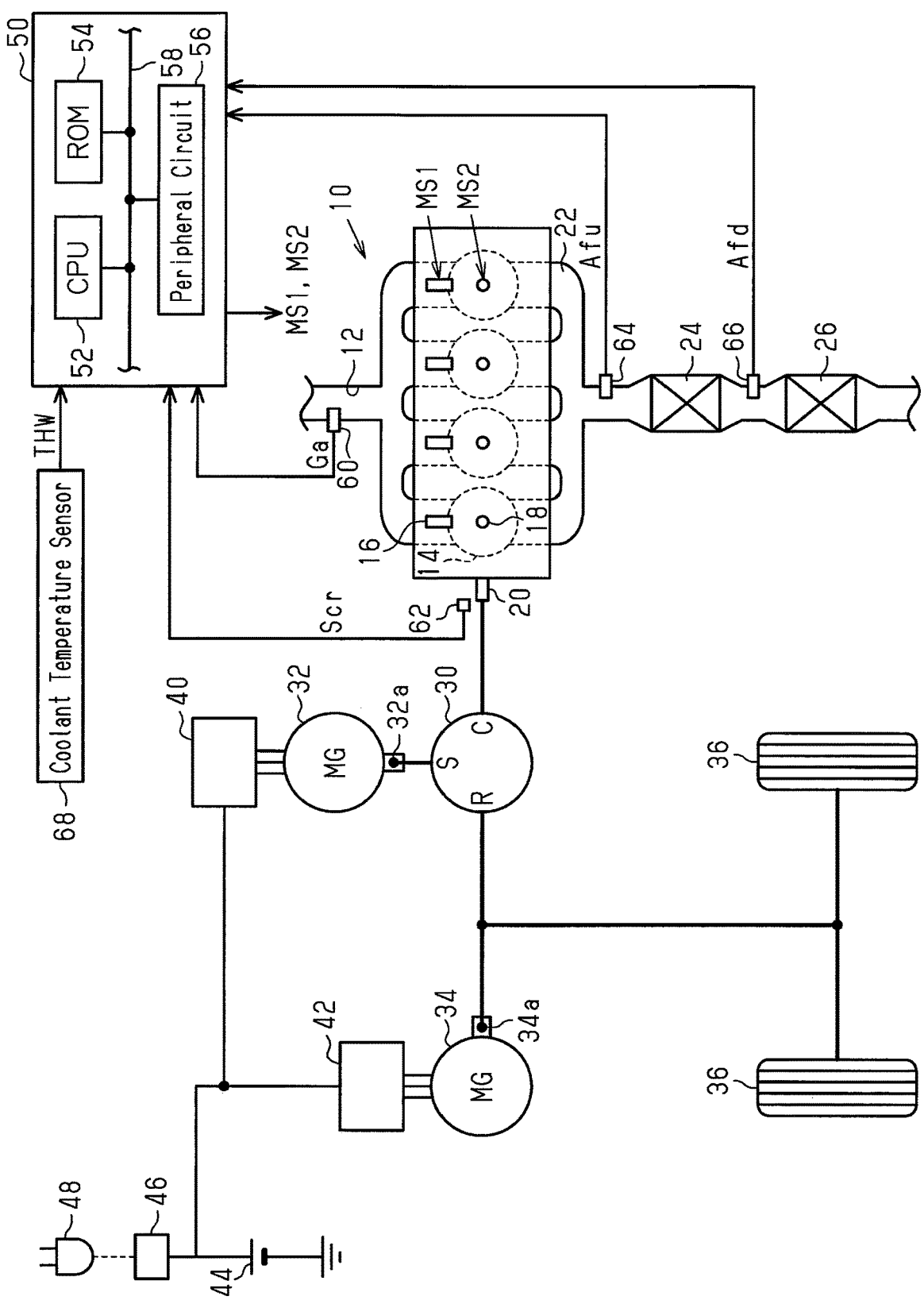
FIG. 1 is a view showing a controller according to an embodiment of the present disclosure and a drive system of a vehicle.

In the internal combustion engine 10 shown in FIG. 1, air taken in from an intake passage 12 flows into a combustion chamber 14. In the combustion chamber 14, the mixture of the fuel injected from a fuel injection valve 16 with the air flowing in from the intake passage 12 is subjected to combustion by the spark discharge of an igniter 18, and the energy generated by the combustion is converted to rotational energy of a crankshaft 20. The mixture subjected combustion is discharged to an exhaust passage 22 as exhaust gas. The exhaust passage 22 is provided with an upstream three-way catalyst 24 and a downstream three-way catalyst 26.

The crankshaft 20 is mechanically connected to a carrier C of a planetary gear mechanism 30 that forms a power split mechanism. The rotary shaft 32a of a motor generator 32 is mechanically connected to a sun gear S of the planetary gear mechanism 30, and a rotary shaft 34a of a motor generator 34 and driven wheels 36 are mechanically connected to a ring gear R of the planetary gear mechanism 30. Thus, the internal combustion engine 10 in the present embodiment is one of the drive sources in the series-parallel hybrid vehicle.

Electric power of a battery 44 is supplied to a motor generator 32 through an inverter 40, and electric power of the battery 44 is supplied to the motor generator 34 through an inverter 42. A charger 46 that charges the battery 44 with the power supplied through an external plug 48 is connected to the battery 44. Therefore, the vehicle according to the present embodiment is a so-called plug-in hybrid vehicle capable of charging the battery 44 with power supplied from the outside.

A controller 50 controls the internal combustion engine 10 as a control target, and operates the operation portions of the internal combustion engine 10 such as the fuel injection valve 16 and the igniter 18 in order to control the torque, which is the control amount of the internal combustion engine 10, the exhaust component ratio, and the like. That is, for example, an operation signal MS1 is output to the fuel injection valve 16 to operate the fuel injection valve 16, and an operation signal MS2 is output to the igniter 18 to operate the igniter 18.

The controller 50 refers to an intake air amount Ga detected by an air flow meter 60 and an output signal Scr of a crank angle sensor 62 in order to control the control amount. Also, the controller 50 refers to an upstream air-fuel ratio Afu detected by an upstream air-fuel ratio sensor 64 provided upstream of the three-way catalyst 24, a downstream air-fuel ratio Afd detected by a downstream air-fuel ratio sensor 66 provided downstream of the three-way catalyst 24 and upstream of the three-way catalyst 26, and the temperature (coolant temperature THW) of the coolant of the internal combustion engine 10 detected by a coolant temperature sensor 68.

The controller 50 includes a CPU 52, a ROM 54, and a peripheral circuit 56, which are connected by a communication line 58. The peripheral circuit 56 includes a circuit that generates a clock signal that defines an internal operation, a power supply circuit, a reset circuit, and the like.

Figure 2:
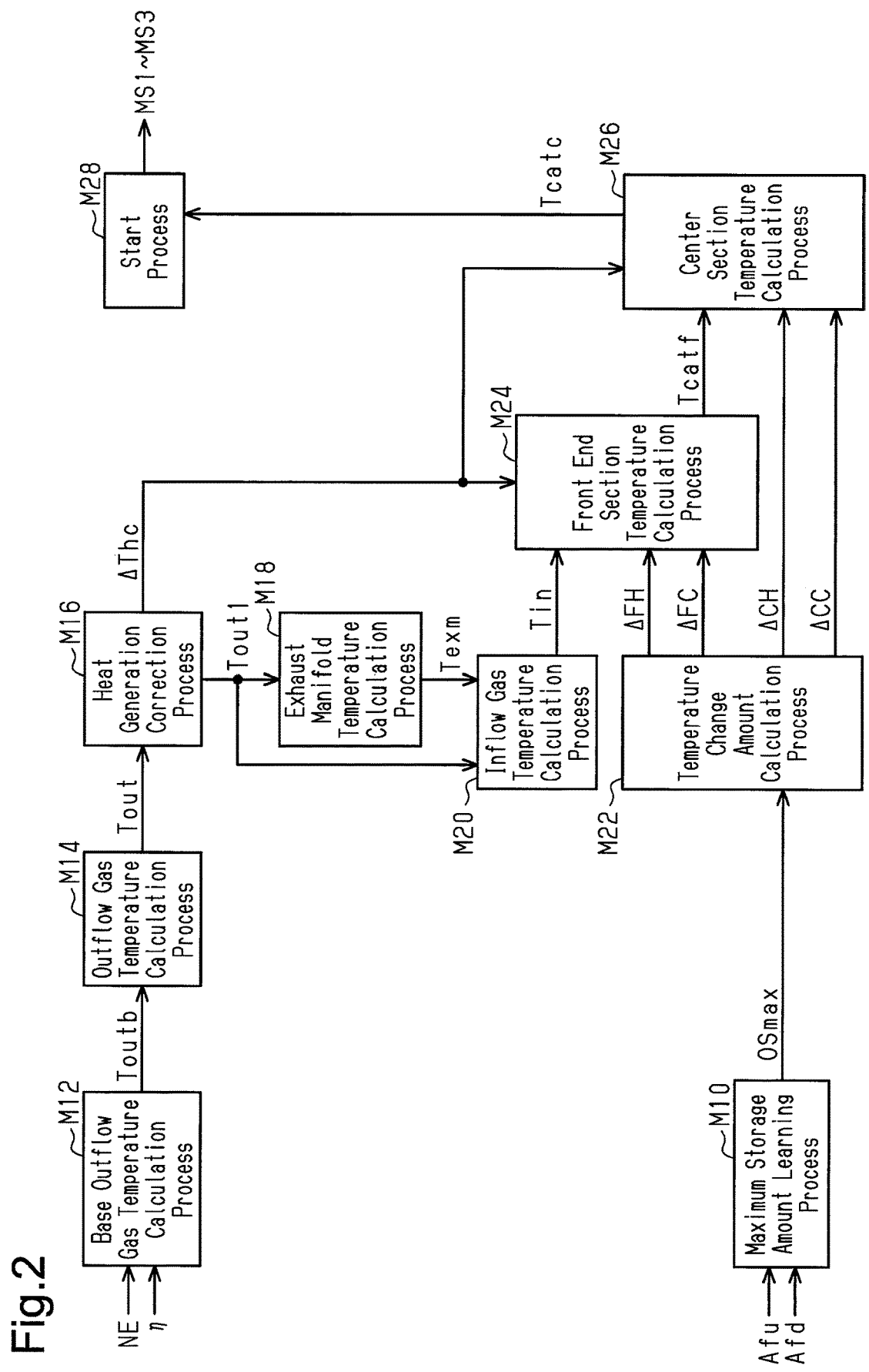
FIG. 2 is a block diagram showing processes performed by a controller in the vehicle of FIG. 1.

The process performed by the controller 50 is shown in FIG. 2. The process shown in FIG. 2 is implemented by the CPU 52 executing a program stored in the ROM 54.

A maximum storage amount learning process M10 is a process of learning the maximum value OSmax of an oxygen storage amount OS of the three-way catalyst 24 based on the upstream air-fuel ratio Afu and the downstream air-fuel ratio Afd. Specifically, the fuel injection valve 16 is operated such that the upstream air-fuel ratio Afu is lean, triggered by the fact that the downstream air-fuel ratio Afd is inverted from lean to rich, and the maximum value OSmax of the oxygen storage amount OS is calculated based on the amount of oxygen flowing into the three-way catalyst 24 before the downstream air-fuel ratio Afd is inverted to lean after it is inverted to rich. Specifically, the maximum storage amount learning process M10 includes a process of calculating the flow rate of oxygen flowing into the three-way catalyst 24 based on the upstream air-fuel ratio Afu and the intake air amount Ga.

A base outflow gas temperature calculation process M12 is a process of calculating a base outflow gas temperature Toutb, which is a base value of an outflow gas temperature Tout, based on the operating point of the internal combustion engine 10. The outflow gas temperature Tout is the temperature of the fluid flowing out of the combustion chamber 14 into the exhaust passage 22. In the present embodiment, the operating point of the internal combustion engine 10 is defined by the charging efficiency $\eta$ as the load of the internal combustion engine 10 and the rotational speed NE. The charging efficiency $\eta$ is a parameter that determines the amount of air charged into the combustion chamber 14 of the internal combustion engine 10, and is calculated by the CPU 52 based on the intake air amount Ga and the rotational speed NE. The rotational speed NE is calculated by the CPU 52 based on the output signal Scr.

Specifically, the rotational speed NE and the charging efficiency $\eta$ are used as input variables, and the base outflow gas temperature Toutb is calculated on a map by the CPU 52 in a state where map data having the base outflow gas temperature Toutb as an output variable is stored in advance in the ROM 54. When calculating the base outflow gas temperature Toutb, it is assumed that for example, the air-fuel ratio is a predetermined air-fuel ratio (here, stoichiometric air-fuel ratio is assumed), the ignition timing is a predetermined ignition timing (here, minimum advance for best torque (MBT) is assumed), and the coolant temperature THW is a predetermined temperature.

The map data is data set of discrete values of the input variable and values of the output variables corresponding to the values of the input variable. Also, the map calculation may be performed such that, for example, when the value of the input variable matches any of the values of the input variable of map data, the value of the output variable of the corresponding map data is made to be the calculation result, and when it does not match, the value obtained by interpolating the values of a plurality of output variables included in map data is made to be the calculation result.

An outflow gas temperature calculation process M14 is a process of calculating the outflow gas temperature Tout by correcting the base outflow gas temperature Toutb based on the deviation of the actual state from the conditions assumed in calculating the base outflow gas temperature Toutb. That is, for example, when the actual air-fuel ratio deviates from the assumed air-fuel ratio, the outflow gas temperature Tout is calculated by and decrease-correcting the base outflow gas temperature Toutb. Further, for example, when the actual ignition timing deviates to the retard side with respect to the assumed ignition timing, the outflow gas temperature Tout is calculated by correcting the base outflow gas temperature Toutb by increasing.

A heat generation correction process M16 is a process of calculating a post-heating generation correction temperature Tout1 by, when unburned fuel and oxygen are present in the fluid discharged from the combustion chamber 14, calculating the amount of temperature rise of the fluid caused by their combustion, and correcting the outflow gas temperature Tout by the amount of temperature rise upstream of the three-way catalyst 24 among them. Further, the heat generation correction process M16 includes a process of calculating an in-catalyst temperature rise amount $\Delta Thc$ which is the amount of temperature rise of the three-way catalyst 24 among the calculated amount of temperature rise. Assuming that the more the ignition timing is retarded with respect to the MBT, the larger the amount of unburned fuel and the amount of oxygen existing in the fluid discharged from the combustion chamber 14 is, the heat generation correction process M16 includes the process of calculating the amount of temperature rise by the reaction heat into a large value.

An exhaust manifold temperature calculation process M18 is a process of sequentially updating the exhaust manifold temperature Texm based on the difference between the temperature of the exhaust passage 22 (exhaust manifold temperature Texm) and the coolant temperature THW. Specifically, the exhaust manifold temperature calculation process M18 includes a process of correcting and updating the exhaust manifold temperature Texm by the decrease-correction amount by performing the calculation in which the higher the exhaust manifold temperature Texm is than the coolant temperature THW, the larger the decrease-correction amount of the exhaust manifold temperature Texm becomes. However, if the internal combustion engine 10 is not in the stopped state, the exhaust manifold temperature calculation process M18 further includes a process of correcting and updating the exhaust manifold temperature Texm by the increase-correction amount by performing the calculation in which the higher the post-heating generation correction temperature Tout1 is than the exhaust manifold temperature Texm, the larger the increase-correction amount of the exhaust manifold temperature Texm becomes.

An inflow gas temperature calculation process M20 is a process of calculating an inflow gas temperature Tin by correcting the post-heating generation correction temperature Tout1 based on the difference between the post-heating generation correction temperature Tout1 and the exhaust manifold temperature Texm. The inflow gas temperature Tin is the temperature of the fluid flowing into the three-way catalyst 24. Specifically, by performing the calculation in which the higher the post-heating generation correction temperature Tout1 is than the exhaust manifold temperature Texm, the greater the decrease-correction amount becomes, a value obtained by decrease-correcting the post-heating generation correction temperature Tout1 by the decrease-correction amount is taken as the inflow gas temperature Tin.

A temperature change amount calculation process M22 is a process of calculating the temperature change amount of the front end section and the temperature change amount of the center section when the region of the three-way catalyst 24 from upstream to downstream is divided into the front end section, the center section, and the rear end section.

Figure 3:
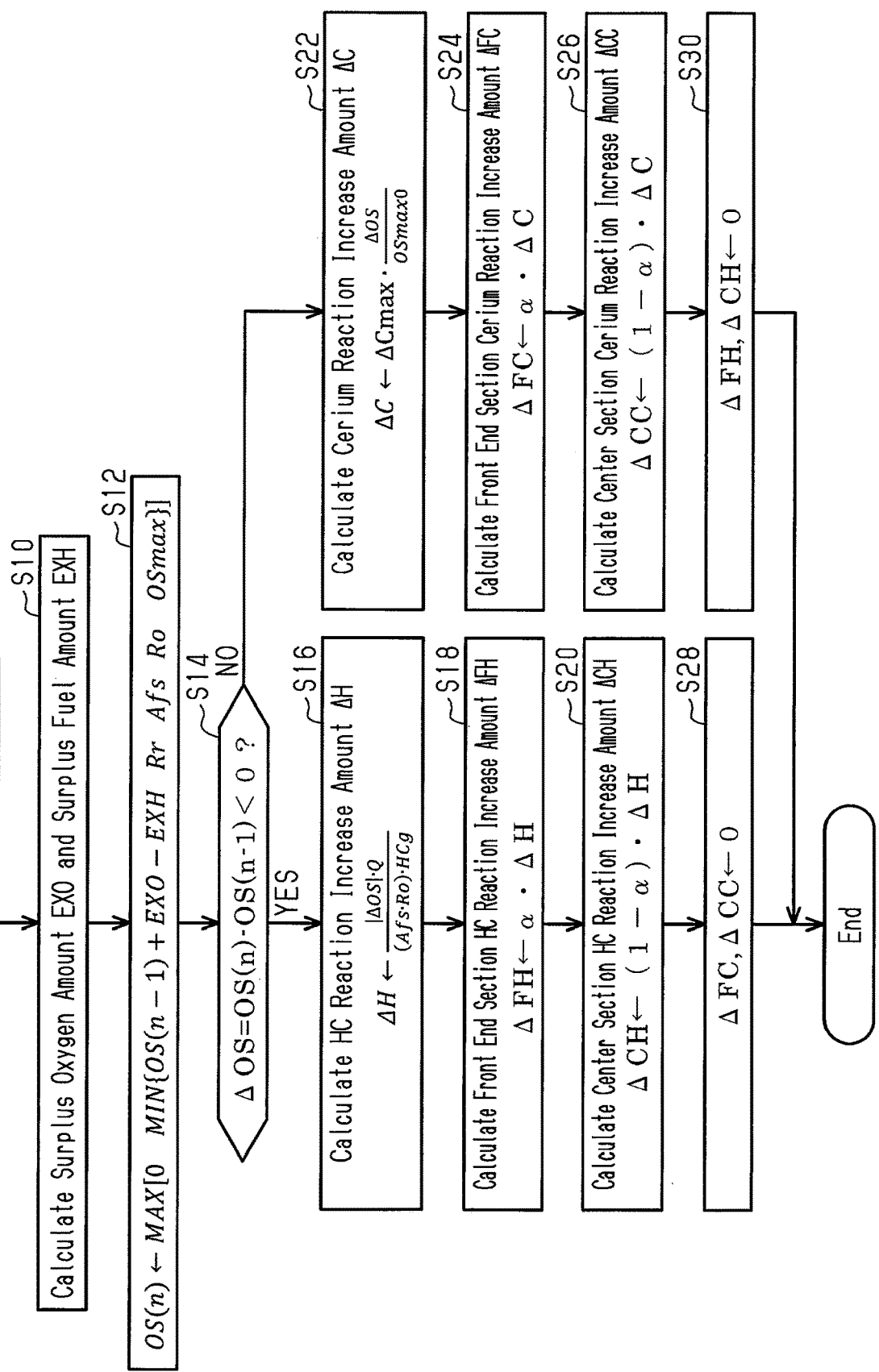
FIG. 3 is a flowchart showing the procedure of a process of calculating a temperature change amount of the catalyst in the vehicle of FIG. 1.

FIG. 3 shows the procedure of the temperature change amount calculation process M22. The process shown in FIG. 3 is implemented by the CPU 52 repeatedly executing the program stored in the ROM 54 at a predetermined interval, for example. Below, the step number of each process is expressed by the number to which S is given at the head.

In the series of processes shown in FIG. 3, the CPU 52 first calculates a surplus oxygen amount EXO and a surplus fuel amount EXH based on the intake air amount Ga and the upstream air-fuel ratio Afu (S10). The surplus oxygen amount EXO and the surplus fuel amount EXH are amounts remaining after the fuel and the oxygen in the mixture react with each other as much as possible. That is, the surplus oxygen amount EXO is zero when the upstream air-fuel ratio Afu is richer than the stoichiometric air-fuel ratio, and the surplus oxygen amount EXO is greater than zero, when the upstream air-fuel ratio Afu is leaner than the stoichiometric air-fuel ratio. The surplus fuel amount EXH is zero when the upstream air-fuel ratio Afu is leaner than the stoichiometric air-fuel ratio, and the surplus fuel amount EXH is greater than zero, when the upstream air-fuel ratio Afu is richer than the stoichiometric air-fuel ratio.

Next, the CPU 52 calculates the oxygen storage amount OS based on the surplus fuel amount EXH and the surplus oxygen amount EXO (S12). Specifically, the CPU 52 sets the increase-correction amount of the oxygen storage amount OS to the surplus oxygen amount EXO. Further, the CPU 52 sets the decrease-correction amount of the oxygen storage amount OS to the product of the surplus fuel amount EXH, a catalytic reaction rate Rr, a stoichiometric air-fuel ratio Afs, and an oxygen mass ratio Ro in the air. The catalytic reaction rate Rr represents the ratio of the unburned fuel amount that reacts with oxygen stored in the three-way catalyst 24 to the unburned fuel amount in the fluid flowing into the three-way catalyst 24.

However, the CPU 52 performs guard processing so that the oxygen storage amount OS is greater than or equal to zero and less than or equal to the maximum value OSmax. That is, the CPU 52 sets the oxygen storage amount OS to the maximum value OSmax when the oxygen storage amount OS corrected by the surplus oxygen amount EXO be increasing exceeds the maximum value OSmax. In addition, the CPU 52 sets the oxygen storage amount OS to zero when the oxygen storage amount OS decrease-corrected by EXH·Rr·Afs·Ro is less than zero.

Next, the CPU 52 determines whether a storage change amount $\Delta$OS obtained by subtracting the oxygen storage amount OS(n−1) calculated in the previous control cycle of the process shown in FIG. 3 from the oxygen storage amount OS(n) calculated this time is negative (S14). This process is to determine whether the unburned fuel in the fluid flowing into the three-way catalyst 24 reacts with the oxygen stored in the three-way catalyst 24 because the upstream air-fuel ratio Afu is richer than the stoichiometric air-fuel ratio.

When it is determined that the storage change amount $\Delta$OS is negative (S14: YES), the CPU 52 calculates an HC reaction increase amount $\Delta$H (S16). The HC reaction increase amount $\Delta$H is the amount of temperature rise of the fluid due to the unburned fuel in the amount of EXH·Rr in the fluid flowing into the three-way catalyst 24 reacting with the oxygen stored in the three-way catalyst 24. Specifically, the CPU 52 sets the HC reaction increase amount $\Delta$H to a value obtained by dividing the value obtained by multiplying the absolute value of the storage change amount $\Delta$OS by a reaction-heat amount Q between a unit amount of oxygen and fuel by the product of the stoichiometric air-fuel ratio Afs, the oxygen mass ratio Ro, and a heat capacity HCg of the fluid. The heat capacity HCg of the fluid is the heat capacity of the fluid flowing into the three-way catalyst 24 during the control cycle of the process shown in FIG. 3. The heat capacity HCg of the fluid is calculated to be a larger value when the intake air amount Ga is large than when it is small.

Next, the CPU 52 calculates a front end section HC reaction increase amount $\Delta$FH, which is the amount of temperature rise of the fluid in the front end section of the three-way catalyst 24 by the unburned fuel in the fluid flowing into the three-way catalyst 24 reacting with the oxygen stored in the three-way catalyst 24 (S18). This is a process of substituting a value obtained by multiplying a coefficient $\alpha$, which is greater than 0 and less than 1, by the HC reaction increase amount $\Delta$H into the front end section HC reaction increase amount $\Delta$FH. The coefficient $\alpha$ is set according to the rate at which the reaction between the unburned fuel in the fluid flowing into the three-way catalyst 24 and the oxygen stored in the three-way catalyst 24 occurs at the front end section. In the present embodiment, it is set to a value greater than $\frac{1}{2}$. The reason is that the amount of reaction between the unburned fuel in the fluid flowing into the three-way catalyst 24 and the oxygen stored in the three-way catalyst 24 tends to increase toward the upstream end of the three-way catalyst 24.

Next, the CPU 52 calculates a center section HC reaction increase amount ΔCH, which is the amount of temperature rise of the fluid in the center section of the three-way catalyst 24 by the unburned fuel in the fluid flowing into the three-way catalyst 24 reacting with the oxygen stored in the three-way catalyst 24 (S20). This is a process of substituting a value obtained by multiplying 1−α by the HC reaction increase amount ΔH into the center section HC reaction increase amount ΔCH.

When it is determined that the storage change amount ΔOS is greater than or equal to zero (S14: NO), the CPU 52 calculates a cerium reaction increase amount ΔC (S22). The cerium reaction increase amount ΔC is the amount of temperature rise of the three-way catalyst 24 by the heat of reaction when the oxygen of the surplus oxygen amount EXO in the fluid flowing in the three-way catalyst 24 reacts with the cerium of the three-way catalyst 24 to become ceria. Specifically, the CPU 52 substitutes, into the cerium reaction increase amount ΔC, a value obtained by multiplying the maximum amount of temperature rise ΔCmax by the storage change amount ΔOS, and dividing the resultant by an initial value OSmax0 of the maximum value OSmax. The maximum amount of temperature rise ΔCmax is the amount of temperature rise of the three-way catalyst 24 by the reaction of cerium and oxygen from when the oxygen storage amount of the three-way catalyst 24 is zero to when the oxygen storage amount of the three-way catalyst 24 reaches the initial value OSmax0 of the maximum value OSmax, and is measured beforehand through experiments and the like and stored in the ROM 54. The initial value OSmax0 of the maximum value OSmax is the maximum value of the oxygen storage amount OS at the initial stage of the three-way catalyst 24, and its value acquired in advance by measurement or the like is stored in the ROM 54.

Next, the CPU 52 calculates a front end section cerium reaction increase amount ΔFC, which is the amount of temperature rise of the front end section of the three-way catalyst 24 by the heat of reaction when the oxygen in the fluid flowing in the three-way catalyst 24 reacts with the cerium of the three-way catalyst 24 to become ceria (S24). Specifically, the CPU 52 substitutes a value obtained by multiplying the cerium reaction increase amount ΔC by the coefficient α into the front end section cerium reaction increase amount ΔFC. Further, the CPU 52 calculates a center section cerium reaction increase amount ΔCC, which is the amount of temperature rise of the center section of the three-way catalyst 24 by the heat of reaction when the oxygen in the fluid flowing in the three-way catalyst 24 reacts with the cerium of the three-way catalyst 24 to become ceria (S26). Specifically, the CPU 52 substitutes a value obtained by multiplying the cerium reaction increase amount ΔC by 1−α into the center section cerium reaction increase amount ΔCC.

When the process of S20 is completed, the CPU 52 substitutes zero into the front end section cerium reaction increase amount ΔFC and the center section cerium reaction increase amount ΔCC (S28), and ends the series of processes shown in FIG. 3. Further, when the process of S26 is completed, the CPU 52 substitutes zero into the front end section HC reaction increase amount ΔFH and the center section HC reaction increase amount ΔCH (S30), and ends the series of processes shown in FIG. 3.

Referring back to FIG. 2, a front end section temperature calculation process M24 is a process of calculating a front end section temperature Tcatf.

Figure 4:
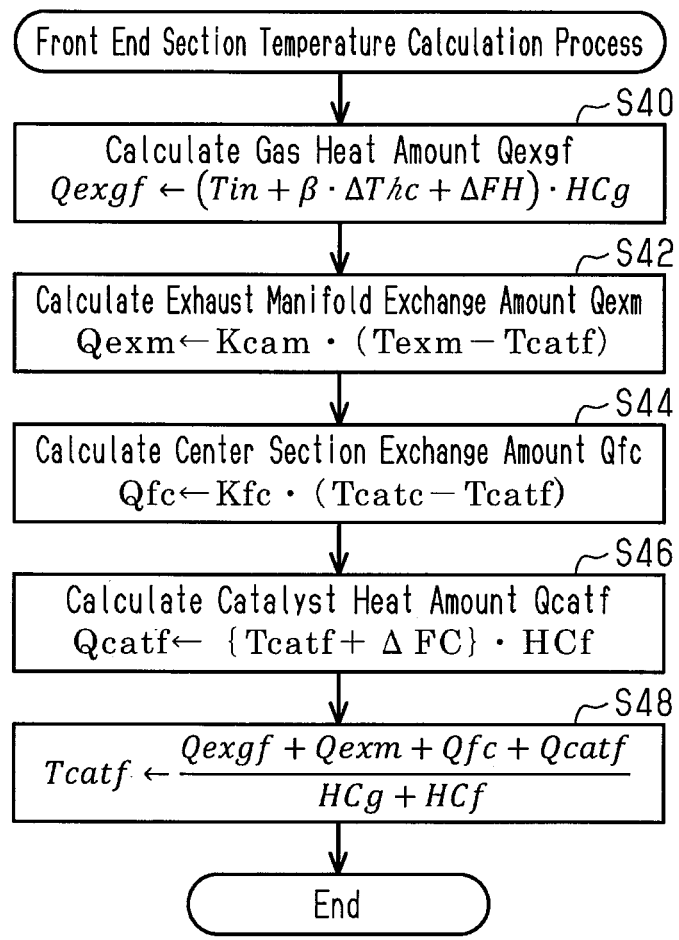
FIG. 4 is a flowchart showing a procedure of a process of calculating the temperature of a front end section of the catalyst in the vehicle of FIG. 1.

FIG. 4 shows the procedure of the front end section temperature calculation process M24. The process shown in FIG. 4 is implemented by the CPU 52 repeatedly executing the program stored in the ROM 54 at a predetermined interval, for example.

In the series of processes shown in FIG. 4, the CPU 52 first calculates the amount of heat (gas heat amount Qexgf) of the fluid in the front end section of the three-way catalyst 24 (S40). The gas heat amount Qexgf is a calculation parameter for calculating the front end section temperature Tcatf. Specifically, the CPU 52 substitutes, into the gas heat amount Qexgf, a value obtained by multiplying, by the heat capacity HCg of the fluid, the sum of the inflow gas temperature Tin, a value obtained by multiplying the in-catalyst temperature rise amount ΔThc by a coefficient β, and the front end section HC reaction increase amount ΔFH. The coefficient β indicates the temperature increase ratio at the front end section of the three-way catalyst 24 in the in-catalyst temperature rise amount ΔThc, and has a value larger than ½ and less than or equal to 1.

Next, the CPU 52 calculates an exhaust manifold exchange amount Qexm, which is the amount of heat received by the front end section of the three-way catalyst 24 from the exhaust passage 22 (S42). The CPU 52 performs calculation in which the higher the exhaust manifold temperature Texm is than the front end section temperature Tcatf, the greater the exhaust manifold exchange amount Qexm becomes. Specifically, the CPU 52 sets the exhaust manifold exchange amount Qexm to a value obtained by multiplying a value obtained by subtracting the front end section temperature Tcatf from the exhaust manifold temperature Texm by a predetermined coefficient Kcam.

Next, the CPU 52 calculates a center section exchange amount Qfc, which is the amount of heat received by the front end section of the three-way catalyst 24 from the center section (S44). The CPU 52 performs calculation in which the higher a center section temperature Tcatc is than the front end section temperature Tcatf, the greater value the center section exchange amount Qfc becomes. Specifically, the CPU 52 substitutes, into the center section exchange amount Qfc, a value obtained by multiplying, by a predetermined coefficient Kfc, a value obtained by subtracting the front end section temperature Tcatf from the center section temperature Tcatc (S44).

Next, the CPU 52 calculates a catalyst heat amount Qcatf, which is the amount of heat possessed by the front end section of the three-way catalyst 24 (S46). The CPU 52 calculates the catalyst heat amount Qcatf by multiplying the sum of the front end section temperature Tcatf and the front end section cerium reaction increase amount ΔFC by a heat capacity HCf of the front end section of the three-way catalyst 24.

Then, the CPU 52 updates the front end section temperature Tcatf by a value obtained by dividing the sum of the gas heat amount Qexgf, the exhaust manifold exchange amount Qexm, the center section exchange amount Qfc and the catalyst heat amount Qcatf by the heat capacity HCg of the fluid and the heat capacity HCf of the front end section of the three-way catalyst 24 (S48). When the process of S48 is completed, the CPU 52 ends the series of processes shown in FIG. 4.

Referring back to FIG. 2, a center section temperature calculation process M26 is a process of calculating the center section temperature Tcatc.

Figure 5:
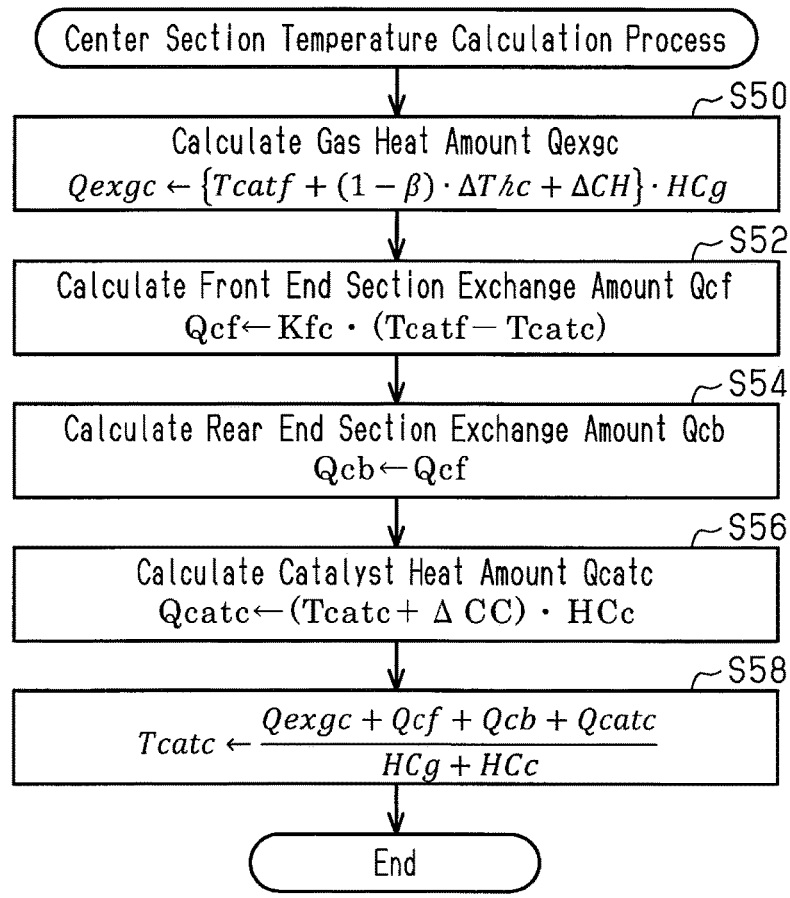
FIG. 5 is a flowchart showing a procedure of a process of calculating the temperature of a center section of the catalyst in the vehicle of FIG. 1.

FIG. 5 shows the procedure of the center section temperature calculation process M26. The process shown in FIG. 5 is implemented by the CPU 52 repeatedly executing the program stored in the ROM 54 at a predetermined interval, for example.

In the series of processes shown in FIG. 5, the CPU 52 first calculates the amount of heat of the fluid (gas heat amount Qexgc) in the center section of the three-way catalyst 24 (S50). The gas heat amount Qexgc is a calculation parameter for calculating the center section temperature Tcatc. Specifically, the CPU 52 substitutes, into the gas heat amount Qexgc, a value obtained by multiplying, by the heat capacity HCg of the fluid, the sum of the front end section temperature Tcatf, which is regarded as the temperature of the fluid flowing into the center section of the three-way catalyst 24, a value obtained by multiplying the in-catalyst temperature rise amount ΔThc by 1−β, and the center section HC reaction increase amount ΔCH.

Next, the CPU 52 calculates a front end section exchange amount Qcf, which is the amount of heat received by the center section of the three-way catalyst 24 from the front end section (S52). The CPU 52 performs calculation in which the higher the front end section temperature Tcatf is than the center section temperature Tcatc, the greater the front end section exchange amount Qcf becomes. Specifically, the CPU 52 sets the front end section exchange amount Qcf to a value obtained by multiplying, by the predetermined coefficient Kfc, a value obtained by subtracting the center section temperature Tcatc from the front end section temperature Tcatf.

Next, the CPU 52 calculates a rear end section exchange amount Qcb, which is the amount of heat received by the center section of the three-way catalyst 24 from the rear end section (S54). In the present embodiment, it is assumed that the heat capacities of the front end section and the rear end section are equal, and the rear end section exchange amount Qcb is equal to the front end section exchange amount Qcf. This corresponds to the present embodiment, which is intended to increase the estimation accuracy of the temperature of the three-way catalyst 24 particularly when the internal combustion engine 10 is stopped. That is, when the internal combustion engine 10 is stopped or the like, the volume when the mixture subjected to combustion is discharged from the combustion chamber 14 can be ignored. Therefore, it is probable that the difference between the heat exchange between the front end section and the center section of the three-way catalyst 24 and the heat exchange between the rear end section and the center section is not large.

Next, the CPU 52 calculates a catalyst heat amount Qcatc, which is the amount of heat possessed by the center section of the three-way catalyst 24 (S56). The CPU 52 calculates the catalyst heat amount Qcatc by multiplying, by a heat capacity HCc of the center, the sum of the center section temperature Tcatc and the center section cerium reaction increase amount ΔCC.

Then, the CPU 52 updates the center section temperature Tcatc by a value obtained by dividing the sum of the gas heat amount Qexgc, the front end section exchange amount Qcf, the rear end section exchange amount Qcb and the catalyst heat amount Qcatc by the heat capacity HCg of the fluid and the heat capacity HCc of the center section of the three-way catalyst 24 (S58). When the process of S58 is completed, the CPU 52 ends the series of processes shown in FIG. 5.

The CPU 52 calculates the catalytic reaction rate Rr used in the process of S12 of FIG. 3 based on the catalytic reaction rate Rr at the front end section of the three-way catalyst 24 and the catalytic reaction rate Rr at the center section. That is, the CPU 52 sets the catalytic reaction rate Rr to be variable according to the temperature of the three-way catalyst 24 and the flow rate of the fluid flowing into the three-way catalyst 24, calculates the catalytic reaction rate Rr at the front end section by using the front end section temperature Tcatf as the temperature of the three-way catalyst 24, and calculates the catalytic reaction rate Rr in the center section by using the center section temperature Tcatc as the temperature of the three-way catalyst 24. Then, the CPU 52 calculates the catalytic reaction rate Rr used in the process of S12 by the sum of a value obtained by multiplying the catalytic reaction rate Rr at the front end section of the three-way catalyst 24 by the coefficient α, and a value obtained by multiplying the catalytic reaction rate Rr at the center section by 1−α. The flow rate of the fluid is calculated based on the amount of fuel injected from the fuel injection valve 16 and the intake air amount Ga.

Referring back to FIG. 2, a start process M28 is a process in which when the internal combustion engine 10 is stopped in a state where the vehicle can travel, it is determined whether the center section temperature Tcatc is less than or equal to a predetermined temperature, and when it is determined that the temperature is less than or equal to the predetermined temperature, the temperature decrease of the three-way catalyst 24 is suppressed by starting the internal combustion engine 10. The "state in which the vehicle can travel" is, for example, that a switch for enabling supply of electric power to the motor generators 32 and 34 is turned on. Therefore, "a state in which the vehicle can travel" includes a state in which the motor generators 32 and 34 are driven and the vehicle is traveling.

The operation and advantages of the present embodiment will now be described.

Figure 6:
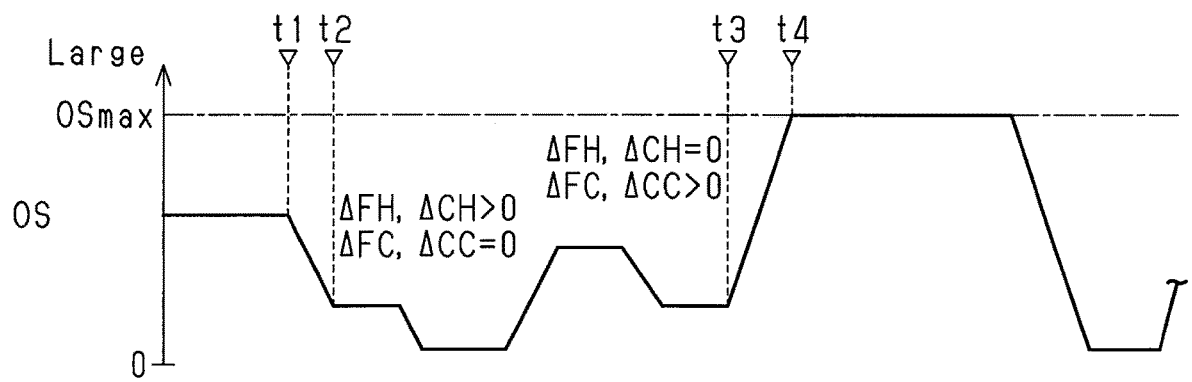
FIG. 6 is a timing diagram for explaining a process of calculating a temperature change amount of the catalyst according to the oxygen storage amount in the vehicle of FIG. 1.

FIG. 6 shows changes in the oxygen storage amount OS. As shown in FIG. 6, during a period from a point in time t1 to a point in time t2, when the oxygen storage amount OS decreases, the CPU 52 calculates the front end section HC reaction increase amount ΔFH and the center section HC reaction increase amount ΔCH to values greater than zero, while calculating the front end section cerium reaction increase amount ΔFC and the center section cerium reaction increase amount ΔCC to zero. During a period from a point in time t3 to a point in time t4, when the oxygen storage amount OS increases, the CPU 52 calculates the front end section cerium reaction increase amount ΔFC and the center section cerium reaction increase amount ΔCC to values greater than zero, while calculating the front end section HC reaction increase amount ΔFH and the center section HC reaction increase amount ΔCH to zero. In FIG. 6, it is assumed that oxygen is excessively introduced into the three-way catalyst 24 even after the point in time t4 by the fuel cutoff process. However, since the oxygen storage amount OS reaches the maximum value OSmax at the point in time t4, the CPU 52 does not change the oxygen storage amount OS after the point in time t4. Therefore, the front end section cerium reaction increase amount ΔFC and the center section cerium reaction increase amount ΔCC become zero.

Thus, according to the present embodiment, when the oxygen storage amount OS reaches the maximum value OSmax, the front end section cerium reaction increase amount ΔFC and the center section cerium reaction increase amount ΔCC are made zero. Therefore, it is possible to suppress an increase in the calculated value of the temperature of the three-way catalyst 24, for example, supposing that the reaction has occurred despite the fact that the reaction between cerium and oxygen is not actually occurring in the three-way catalyst 24. Therefore, the temperature of the three-way catalyst 24 is calculated with high accuracy. Therefore, the predetermined temperature that is a condition for starting the internal combustion engine 10 by the start process M28 can be set to a lower temperature, as compared with a case where, for example, even after the oxygen storage amount OS reaches the maximum value OSmax, the front end section cerium reaction increase amount ΔFC and the center section cerium reaction increase amount ΔCC are made to a value greater than zero. Therefore, according to the present embodiment, while ensuring the exhaust purification performance by the three-way catalyst 24 at the time of restart of the internal combustion engine 10, the stop time of the internal combustion engine 10 can be lengthened, as compared with the case where, for example, even after the oxygen storage amount OS reaches the maximum value OSmax, the front end section cerium reaction increase amount ΔFC and the center section cerium reaction increase amount ΔCC are made to a value greater than zero.

The present embodiment described above further has the following advantages.

(1) The three-way catalyst 24 is divided into the front end section, the center section, and the rear end section, and the temperature of the center section is calculated while taking into consideration heat exchange between them. Therefore, the center section temperature Tcatc is calculated with higher accuracy while taking into consideration the fact that the center section has a higher heat retention performance than the front end section and the rear end section. If the temperature of the center section of the three-way catalyst 24 is the activation temperature, the purification performance of the three-way catalyst 24 when the internal combustion engine 10 is started is ensured. Therefore, it is properly determined whether the internal combustion engine 10 is started in the stopped state of the internal combustion engine 10 based on the center section temperature Tcatc.

(2) The front end section cerium reaction increase amount ΔFC is larger than the center section cerium reaction increase amount ΔCC. Therefore, the front end section temperature Tcatf and the center section temperature Tcatc can be calculated by taking into consideration the fact that the upstream portion of the three-way catalyst 24 stores oxygen more easily than the downstream portion.

(3) The maximum value OSmax of the oxygen storage amount OS is learned. Therefore, even when the maximum value OSmax changes due to the aging deterioration of the three-way catalyst 24, the maximum value OSmax of the three-way catalyst 24 is acquired with high accuracy.

<Correspondence>

The correspondence between the items in the above-described embodiments and the items described in the above SUMMARY is as follows. Below, the correspondence is shown for each of the numbers in the examples described in the above SUMMARY.

[1] and [4] The "catalyst" corresponds to the three-way catalyst 24, and the "temperature calculation device" corresponds to the controller 50.

The "storage amount calculation process" corresponds to the processes of S10 and S12, and the "amount of oxygen and the amount of the unburned fuel components in the fluid" correspond to the surplus oxygen amount EXO and the surplus fuel amount EXH.

The "temperature calculation process" corresponds to the processes of S14 to S58, and in particular, corresponds to calculating the cerium reaction increase amount ΔC to a larger value when the storage change amount ΔOS is positive and large than when it is small. That is, the "temperature calculation process" corresponds a process in which the catalyst heat amount Qcatf and Qcatc are calculated to be large values in S46 and S56, and the amount of update from the previous values of the front end section temperature Tcatf and the center section temperature Tcatc are large values.

[2] Example 2 corresponds to the fact that by the process of S16 of FIG. 3, the HC reaction increase amount ΔH is calculated to be a larger value when the storage change amount ΔOS is negative and the absolute value of the storage change amount ΔOS is large than when it is small, and, therefore, the gas heat amount Qexgf and Qexgc calculated by the processes of S40 and S50 are calculated to be large values. That is, Example 2 corresponds to the fact that the gas heat amount Qexgf and Qexgc are calculated to large values, so that the amount of update from the previous values of the front end section temperature Tcatf and the center section temperature Tcatc are large values.

[3] The "first region" corresponds to the front end section of the three-way catalyst 24, and the "second region" corresponds to the center section of the three-way catalyst 24. Example 3 corresponds to the fact that the coefficient α is set to a value larger than ½ in the processes of S24 and S26.

[4] Example 4 corresponds to the maximum storage amount learning process M10. [5] The "rotating electric machine" corresponds to the motor generators 32 and 34.

Other Embodiments

The present embodiment may be modified as follows. The above-described embodiment and the following modifications can be combined as long as the combined modifications remain technically consistent with each other.

Regarding Storage Amount Calculation Process

In the above-described embodiment, the oxygen storage amount OS is calculated using the maximum value OSmax learned by the maximum storage amount learning process M10 as the maximum value of the oxygen storage amount OS. However, the present disclosure is not limited to this, and the oxygen storage amount OS may be calculated using the initial value OSmax0 used in the process of S22, for example.

In the above-described embodiment, the oxygen storage amount is calculated based on the upstream air-fuel ratio Afu and the intake air amount Ga, but the present disclosure is not limited to this. For example, the oxygen storage amount may be calculated based on the intake air amount Ga and the fuel injection amount by the fuel injection valve 16.

Regarding Heat Generation Correction Process M16

In the above-described embodiment, when unburned fuel and oxygen are present in the fluid discharged from the combustion chamber 14, the amount of temperature rise of the fluid caused by the combustion thereof is calculated, but the amount of heat is may be calculated without being limited to this. In this case, the calculated amount of heat may be allocated to the amount of heat which raises the inflow gas temperature Tin, the amount of heat which raises the temperature of the fluid in the front end section of the three-way catalyst 24, and the amount of heat which raises the temperature of the fluid in the center section.

In the above-described embodiment, the heat generation correction is performed on the condition that the unburned fuel and the oxygen are present in the fluid discharged from the combustion chamber 14, but the present disclosure is not limited thereto. A correction amount according to the amount of heat generated when for example, during the fuel cutoff process, the fuel adhering to the intake passage 12 or the piston flows out to the exhaust passage 22 through the combustion chamber 14, and react with the air flowing into the exhaust passage 22 may be calculated. Also in this case, the calculated correction amount may be allocated to the rise-correction amount of the inflow gas temperature Tin, the rise-correction amount of the temperature of the fluid in the front end section of the three-way catalyst 24, and the rise-correction amount of the temperature of the fluid in the center section. Alternatively, the calculated amount of heat may be allocated to the amount of heat which raises the inflow gas temperature Tin, the amount of heat which raises the temperature of the fluid in the front end section of the three-way catalyst 24, and the amount of heat which raises the temperature of the fluid in the center section. In this case, the amount of heat that raises the temperature of the fluid in the front end section of the three-way catalyst 24 may be used in the process of S48, and the amount of heat that raises the temperature of the fluid in the center section may be used in the process of S58. Further, it is possible to obtain the correction amount of the outflow gas temperature Tout by dividing the amount of heat that raises the inflow gas temperature Tin by, for example, the heat capacity of the fluid.

Further, in the case where the internal combustion engine 10 is provided with a forced-induction device and an overlap period occurs in which both the intake valve and the exhaust valve are opened, in some cases, so-called scavenging may occur in which the air drawn into the intake passage 12 flows out to the exhaust passage 22 without being a combustion target in the combustion chamber 14. Therefore, even in this case, the correction amount by the reaction between the air flowing out to the exhaust passage 22 without being a combustion target in the combustion chamber 14 and the fuel adhering to the intake passage 12 or the piston may be calculated.

Regarding Temperature Calculation Process

In the above-described embodiment, when the oxygen storage amount OS increases, in the temperature change amount calculation process M22, the cerium reaction increase amount $\Delta C$, which is the amount of temperature rise of the three-way catalyst 24 due to the heat of reaction when cerium changes to ceria, is calculated, but the present disclosure is not limited to this. For example, the amount of heat may be calculated by multiplying the total heat of reaction during the period from when the oxygen storage amount OS is zero to when it reaches the maximum value OSmax by $\Delta OS/OSmax0$. In this case, the calculated amount of heat may be allocated to the amount of heat of the front end section and the amount of heat of the center section in the processes of S24 and S26, and treated as part of the catalyst heat amount without performing multiplication by the specific heat in the processes of S46 and S56.

In the above-described embodiment, when the oxygen storage amount OS decreases, in the temperature change amount calculation process M22, the HC reaction increase amount $\Delta H$, which is the amount of temperature rise of the fluid due to the reaction between the unburned fuel and the oxygen stored in the three-way catalyst 24, is calculated, but the present disclosure is not limited to this. For example, the amount of heat itself may be calculated, and the amount may be allocated to the amount of heat of the front end section and the amount of heat of the center section instead of the processes of S18 and S20, and added to the target of division by heat capacity in the processes of S48 and S58.

Instead of the gas heat amount Qexgf and Qexgc used in the processes of S48 and S58, values obtained by subjecting these values to an exponential moving average process or low pass filter process may be used. Therefore, even if the amount of heat in the fluid discharged from the combustion chamber 14 to the exhaust passage 22 per unit time rises sharply, it is possible to express that the front end section temperature Tcatf and the center section temperature Tcatc do not rise stepwise, but tend to increase gradually. However, in expressing transient phenomena, using the values subjected to the exponential moving average process or the low pass filter process instead of the gas heat amount Qexgf and Qexgc used in the processes of S48 and S58 is not required. For example, a value obtained by multiplying, by a constant larger than 0 and smaller than 1, the HC reaction increase amount $\Delta H$ calculated by the process of S16 may be used as the input of S18 and S20. In this case, it is possible to express the phenomenon that the temperature of the three-way catalyst 24 gradually increases instead of the temperature of the three-way catalyst 24 rising stepwise by a value obtained by, for example, dividing the amount of heat generated by the reaction between the unburned fuel and the oxygen stored in the three-way catalyst 24 by the sum of the heat capacity of the fluid and the heat capacity of the three-way catalyst 24.

Furthermore, expressing the gradual increase tendency of the front end section temperature Tcatf and the center section temperature Tcatc is not limited to the way shown above. For example, the amount of heat exchange between the fluid flowing into the three-way catalyst 24 and the three-way catalyst 24 may be calculated. That is, for example, a value obtained by multiplying the value obtained by subtracting the front end section temperature Tcatf from the inflow gas temperature Tin by a coefficient is calculated as the amount of heat exchange between the fluid flowing into the three-way catalyst 24 and the front end section of the three-way catalyst 24.

Although the process of calculating the temperature of the rear end section is not performed in the above-described embodiment, this process may be performed. In this case, the amount of heat exchange between the rear end section and the center section can be calculated independently of the amount of heat exchange between the front end section and the center section.

In the above-described embodiment, although the three-way catalyst 24 is divided into the front end section part, the center section, and the rear end section, the present disclosure is not limited to this. For example, it may be divided into two regions or four or more regions. However, it is not required to divide the three-way catalyst 24 into a plurality of regions. In this case, the temperature of the three-way catalyst 24 may be calculated while taking into consideration heat exchange with the upstream fluid, and the like in addition to the HC reaction increase amount $\Delta H$ and the cerium reaction increase amount $\Delta C$.

Regarding Use of Estimated Value

In the above-described embodiment, although the estimated value of the temperature of the three-way catalyst 24 is used for the start process M28 of the internal combustion engine 10, the present disclosure is not limited to this. For example, the estimated value of the temperature of the three-way catalyst 24 may be used to determine whether the internal combustion engine 10 is to be stopped when the internal combustion engine 10 is operating. This can be implemented, for example, by determining that the internal combustion engine 10 is to be stopped when the front end section temperature Tcatf is higher than or equal to a predetermined temperature.

Regarding Maximum Storage Amount Learning Process

In the above-described embodiment, the maximum value OSmax is calculated using the flow rate of oxygen flowing into the three-way catalyst 24 calculated based on the upstream air-fuel ratio Afu and the intake air amount Ga, but the present disclosure is not limited thereto. For example, the flow rate of oxygen calculated based on the fuel injection amount from the fuel injection valve 16 and the intake air amount Ga may be used.

Regarding Temperature Calculating Device and Controller

The temperature calculating device and the controller are not limited to a device that includes the CPU 52 and the ROM 54 and executes software processing. For example, at least part of the processes executed by the software in the above-illustrated embodiments may be executed by hardware circuits dedicated to executing these processes (such as ASIC). That is, the temperature calculating device and the controller may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. Software processing circuits each including a processor and a program storage device and dedicated hardware circuits may be provided. That is, the above processes may be executed in any manner as long as the processes are executed by processing circuitry that includes at least one of a set of one or more software processing circuits and a set of one or more dedicated hardware circuits.

Regarding Vehicle

In the above-described embodiment, a so-called plug-in hybrid vehicle is assumed, which is capable of externally charging the battery 44 storing power supplied to the motor generators 32 and 34. However, the present disclosure is not limited to this. For example, a vehicle that does not have means for charging the battery 44 from the outside of the vehicle may be used.

The hybrid vehicle is not limited to the series-parallel hybrid vehicle, and may be, for example, a parallel hybrid vehicle or a series hybrid vehicle. However, the vehicle is not limited to the hybrid vehicle, and may be a vehicle whose drive source is only the internal combustion engine 10.

Other Modifications

For example, when the fuel injected from the fuel injection valve 16 is the fuel in which the ratio between gasoline and alcohol can change, the reaction-heat amount Q may be variably set according to the alcohol concentration.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A catalyst temperature calculating device applied to an internal combustion engine, a catalyst having an oxygen storage capacity being provided in an exhaust passage of the internal combustion engine, the catalyst temperature calculating device comprising a processor that is configured to perform:
    a storage amount calculation process of calculating an oxygen storage amount of the catalyst to a value greater than or equal to zero and less than or equal to a maximum value based on an amount of oxygen and an amount of unburned fuel components in a fluid flowing into the catalyst; and
    a temperature calculation process of calculating a temperature of the catalyst, wherein the calculating includes adjusting the calculated temperature to be higher due to an amount of temperature rise of the catalyst being larger as an increase amount of the oxygen storage amount is larger in a case where the oxygen storage amount calculated by the storage amount calculation process increases with time.

2. The catalyst temperature calculating device according to claim 1, wherein the temperature calculation process further includes a process of calculating the temperature of the catalyst, wherein the calculating includes adjusting the calculated temperature to be higher due to the amount of temperature rise of the catalyst being larger as a decrease amount of the oxygen storage amount is larger in a case where the oxygen storage amount calculated by the storage amount calculation process decreases with time.

3. The catalyst temperature calculating device according to claim 1, wherein the temperature calculation process includes
    a process of dividing a section of the catalyst from an upstream end to a downstream end into a plurality of regions, the plurality of regions having a first region and a second region downstream of the first region, and
    a process of calculating a temperature of each of the first region and the second region assuming that an amount of temperature rise of the first region is larger than an amount of temperature rise of the second region in a case where the oxygen storage amount calculated by the storage amount calculation process increases with time.

4. The catalyst temperature calculating device according to claim 1, further comprising an air-fuel ratio sensor downstream of the catalyst, wherein
    the processor is further configured to perform a maximum storage amount learning process of learning and updating the maximum value based on a value detected by the air-fuel ratio sensor, and
    the storage amount calculation process includes a process of calculating the oxygen storage amount based on the maximum value learned by the maximum storage amount learning process.

5. A controller for an internal combustion engine, the internal combustion engine being mounted on a vehicle including a rotating electric machine as a drive source, a catalyst having an oxygen storage capacity being provided in an exhaust passage of the internal combustion engine, the controller being configured to perform
    a storage amount calculation process of calculating an oxygen storage amount of the catalyst to a value greater than or equal to zero and less than or equal to a maximum value based on an amount of oxygen and an amount of unburned fuel components in a fluid flowing into the catalyst, a temperature calculation process of calculating a temperature of the catalyst, wherein the calculating includes adjusting the calculated temperature to be higher due to an amount of temperature rise of the catalyst being larger as an increase amount of the oxygen storage amount is larger in a case where the oxygen storage amount calculated by the storage amount calculation process increases with time, and a start process of starting the internal combustion engine based on the temperature of the catalyst calculated by the temperature calculation process when the vehicle is in a state of capable of traveling and the internal combustion engine is in a stopped state.

6. A catalyst temperature calculating method applied to an internal combustion engine, a catalyst having an oxygen storage capacity being provided in an exhaust passage of the internal combustion engine, the catalyst temperature calculating method is performed by a processor, the method comprising:

calculating an oxygen storage amount of the catalyst to a value greater than or equal to zero and less than or equal to than a maximum value based on an amount of oxygen and an amount of unburned fuel components in a fluid flowing into the catalyst; and calculating a temperature of the catalyst, wherein the calculating includes adjusting the calculated temperature to be higher due to an amount of temperature rise of the catalyst being larger as an increase amount of the oxygen storage amount is larger in a case where the calculated oxygen storage amount increases with time.

7. A non-transitory computer readable memory medium storing a program that causes processor to perform a catalyst temperature calculation process applied to an internal combustion engine, a catalyst having an oxygen storage capacity being provided in an exhaust passage of the internal combustion engine, the catalyst temperature calculation process including:

calculating an oxygen storage amount of the catalyst to a value greater than or equal to zero and less than or equal to than a maximum value based on an amount of oxygen and an amount of unburned fuel components in a fluid flowing into the catalyst; and calculating a temperature of the catalyst, wherein the calculating includes adjusting the calculated temperature to be higher due to an amount of temperature rise of the catalyst being larger as an increase amount of the oxygen storage amount is larger in a case where the calculated oxygen storage amount increases with time.

8. The catalyst temperature calculating device according to claim 1, wherein the adjusting the calculated temperature to be higher is based on a cerium reaction increase amount that is a heat of reaction of surplus oxygen and cerium of the catalyst.

* * * * *